Figure 1:
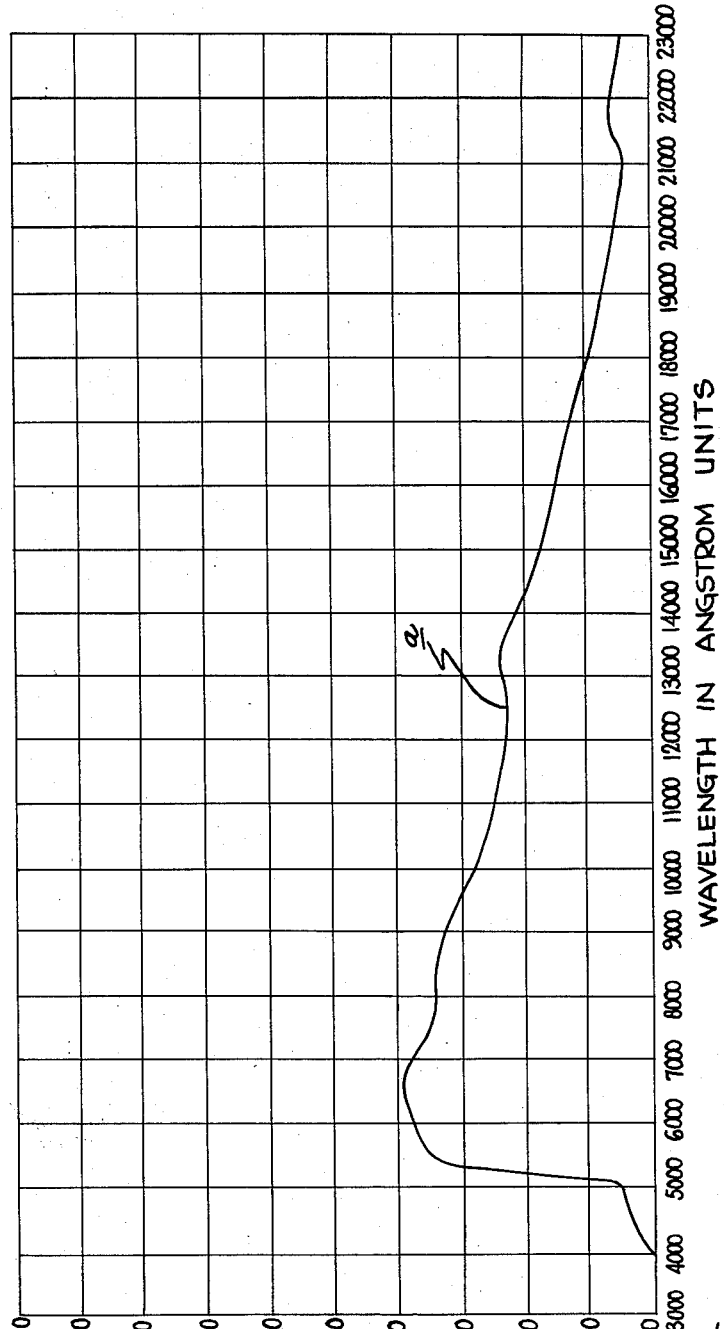

March 3, 1964 J. MAHLER 3,123,568
METHOD OF MAKING OPTICAL FILTERS
Filed March 20, 1961 2 Sheets-Sheet 1

INVENTOR
JOSEPH MAHLER
BY
ATTORNEYS

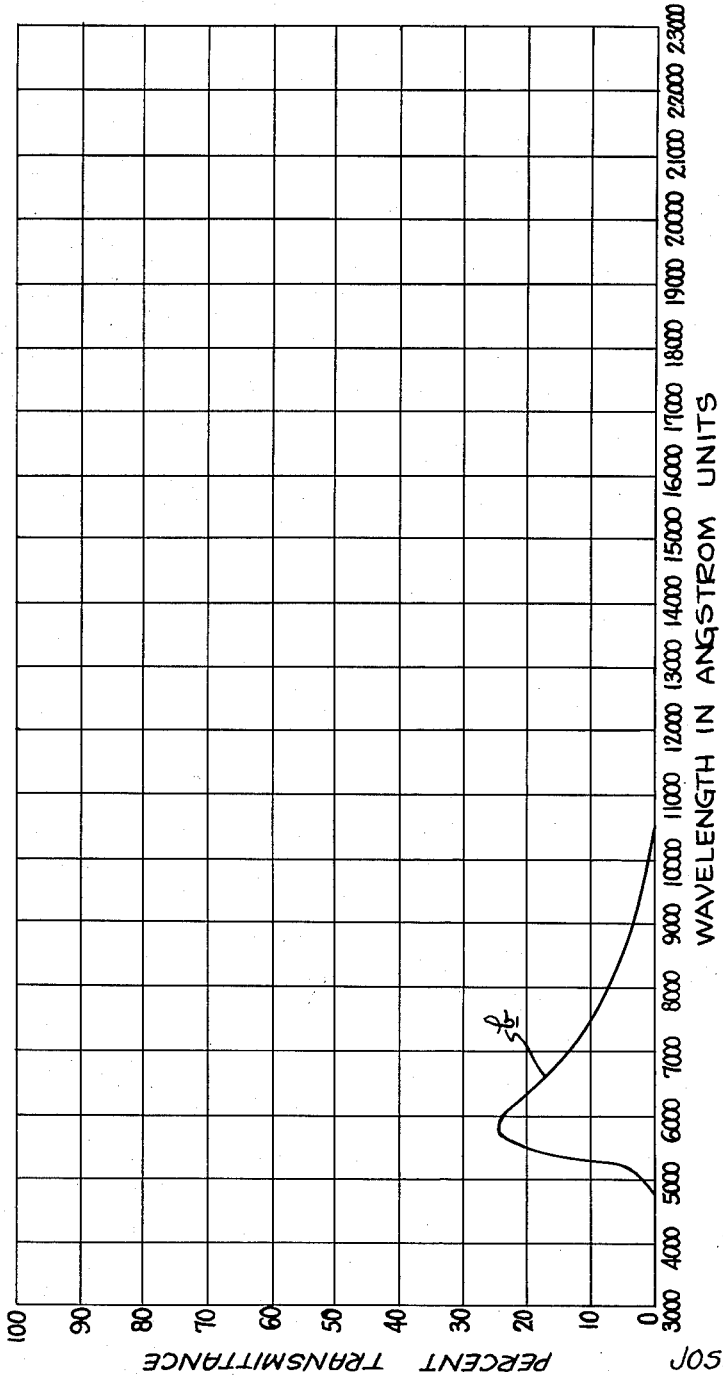

United States Patent Office 3,123,568
Patented Mar. 3, 1964

3,123,568
METHOD OF MAKING OPTICAL FILTERS
Joseph Mahler, Fiskdale, Mass., assignor to American Optical Company, Southbridge, Mass., a voluntary association of Massachusetts
Filed Mar. 20, 1961, Ser. No. 96,894
4 Claims. (Cl. 252—300)

The field of this invention is that of light-absorbing materials, and the invention relates, more particularly, to novel and improved plastic materials having the properties of selective light absorption and transmission and to novel and improved methods for manufacturing such materials.

In many applications of light-absorbing filters where glass filters are presently employed, it would be desirable for various reasons to utilize filters of a plastic material if plastic materials could be adapted to display the desired light-absorbing and light-transmitting characteristics. For example, plastic materials with suitable light-absorbing properties could be used with advantage as inexpensive and substantially unbreakable sunglass lenses. For this reason, many attempts have been made to develop plastic materials and methods for manufacturing plastic materials which are adapted for relatively high transmission of visible light and for suitably high absorption of light in the invisible regions of the spectrum.

It is an object of this invention to provide novel and improved materials and novel and improved methods for manufacturing materials which are adapted to display selective absorptive and transmissive properties for light of different wavelengths; to provide plastic materials and methods for manufacturing such materials which are adapted for relatively high transmission of visible light and for suitably high absorption of infra-red light; to provide such plastic materials and methods for manufacturing such materials which are adapted for relatively high transmission of visible light and which are adapted for near cut-off of light from at least selected portions of the ultra-violet and infra-red regions of the spectrum; to provide such plastic materials and methods for manufacturing such materials which are adapted to retain relatively high infra-red-absorbing characteristics for a useful period of time; and to provide novel and improved methods which can be inexpensively performed for manufacturing such materials.

Other objects, advantages and details of the materials and methods for material manufacture provided by this invention will appear in the following detailed description of preferred embodiments of the materials and methods, the detailed description referring to the drawings in which FIGS. 1 and 2 illustrate transmission curves for materials provided by this invention.

According to this invention, a synthetic plastic material of a normally transparent, non-absorbing character is used to form a matrix or carrier for organic dye compounds of the polyindamine class having infra-red and ultra-violet absorbing characteristics, the dye compounds being formed in situ in dispersed relation within the plastic material to adapt the material for relatively high transmission of light of certain wavelengths in visible region of the spectrum and for suitably high absorption of light in the infra-red and ultra-violet regions of the spectrum. As will be noted, the term "light" as used herein will be considered to include all regions of the electromagnetic spectrum including infra-red and ultra-violet radiations as well as visible light.

In the process of this invention, a light-sensitive dichromate salt such as ammonium dichromate, potassium dichromate, sodium dichromate or the like is established in dispersed relation throughout an otherwise transparent water-permeable plastic material. For example, the dichromate salt can be dissolved in a small amount of water and can be mixed with a water-soluble plastic material in any conventional manner when the plastic is at first in liquid form. The plastic can then be cast or otherwise formed into water-permeable blocks, sheets, films or the like in conventional manner with the dichromate salts finely dispersed therein. Alternatively, the dichromate salts can be dissolved in an aqueous solvent to form a solution which is hereinafter designated solution A. A water-permeable plastic, in solid form, can then be immersed in solution A to permit imbibition of the solution therein for establishing the dichromate salt in dispersed relation throughout the plastic material.

The plastic material is preferably wiped or rinsed or otherwise treated for removing any excess of solution A from the surfaces of the material and is then exposed to light for drying the plastic material and for setting or fixing the dichromate salt within the plastic material. That is, exposure of the plastic material to light is adapted to transform the light-sensitive dichromate salts in well known manner so that the salts are not longer soluble in water and cannot be leached from within the plastic material. The plastic material can then be wiped clean or rinsed in distilled water or otherwise treated for removing loose crystals of the dichromate salt and the like from the surfaces of the plastic material.

The plastic material is then immersed in a second solution hereinafter designated solution B, this latter solution embodying one of a selected group of organic aniline derivatives dissolved in an aqueous solvent. The plastic is permitted to imbibe a quantity of solution B therein to bring about a reaction between the organic substance carried in solution B and the dichromate salt which is dispersed throughout the plastic material.

It is believed that the above-described process results in a reaction in situ within the plastic material, whereby the dichromate salt fixed within the plastic oxidatively polymerizes the selected organic substance imbibed with solution B and then effects further step-wise oxidation of the organic substance for forming variously oxidized polyindamine dye compounds in dispersed relation within the plastic material. In this reaction, certain of the organic dye compounds will progress through one or more low oxidized states and through a series of intermediately oxidized states to achieve what can be considered as highly oxidized forms of the organic substance. Other dye compounds dispersed throughout the plastic will not be so thoroughly oxidized and will achieve only one or the other of the low or intermediately oxidized forms of the organic substance. Only the polyindamine dye compounds which are said to be in an intermediately-oxidized state are believed to have substantial infra-red absorbing properties so that, as will be understood, the infra-red absorbing characteristics of the plastic material depend to a large extent upon regulation of the imbibition process to establish the proper quantity of said dye compounds within the plastic and to assure that the dye compounds comprise intermediately oxidized forms thereof.

Setting of the dichromate salt by exposure to light or by aging fixes the salt within the plastic material so that, during subsequent immersion of the plastic in solution B, the salt cannot be leached from within the plastic for reducing the quantity of the salt dispersed within the plastic or for contaminating solution B. Thus solution B can be retained at controlled purity and concentration, by addition of the selected organic substance and solvent to solution B for example, so that the solution B is adapted for repeated use or even for use in a continuous process. In addition, the plastic material can be immersed in solution B for extended periods of time without reducing the quantity of the dichromate salt dispersed throughout the material so that the quantity of said organic dye compounds to be formed within the plastic material can be conveniently and accurately regulated by control of the amount of dichromate salt originally dispersed in the plastic.

The above-described process can be employed for forming an infra-red and ultra-violet absorbing filter from a number of different water-permeable or water-soluble plastic materials including polyvinyl alcohol, gelatin and various hydrolyzed cellulosic materials such as hydrolyzed cellulose nitrate, hydrolyzed cellulose acetate and cellophane. Soft, water-soluble polyvinyl alcohol materials can be utilized as well as what is called water-permeable polyvinyl alcohol which is not soluble in cold water. The latter plastic material, water-permeable polyvinyl alcohol, is the preferred plastic material for the purposes of this invention for reasons which will be noted below.

The plastic materials treated in the process of this invention are preferably provided in the form of thin sheets or films which can be mounted upon supporting materials prior to treatment or can be sandwiched between supporting materials after treatment if desired. However, the plastic materials can also be provided in the form of relatively thick sheets or plates or can comprise cast objects such as lenses.

Organic substances which have proven useful for imbibition into the plastic materials from solution B include aniline and certain aniline derivatives such as 2,5-diethoxyaniline, 2,5-dimethoxyaniline, N-phenyl-p-phenylenediamine, o-toluidine, and m-toluidine, each of which is adapted to be imbibed by the noted plastic materials when dissolved in an aqueous solvent and which is adapted to be oxidatively polymerized and then further oxidized in stepwise progression by said dichromate salts for forming the above-described infra-red and ultra-violet-absorbing organic polyindamine dye compounds in dispersed relation within the plastic materials.

In forming the described organic dye compounds within a plastic material, the compounds can be provided in greater or lesser quantities for determining the transmissive and absorptive properties of the plastic material. As the quantity of intermediately oxidized dye compounds within the plastic material is increased, the plastic material will be adapted to transmit less light in both the visible and invisible regions of the spectrum.

Where dichromate salts are to be established within the plastic material prior to final casting of the plastic in solid form, a plastic dope can be prepared in conventional manner by dissolving the plastic in water. For example, to provide a polyvinyl alcohol dope which can be subsequently cast to provide a solid plastic shape of uniform, optical density, the plastic and water solution should be between five percent (5%) and ten percent (10%) concentration. A very small quantity of dichromate salts can then be dissolved in the dope and can be mechanically mixed with the dope in any well known manner for uniformly dispersing the salt therein. For example, in a polyvinyl alcohol dope, the salts would preferably be mixed in concentration between five hundredths of one percent (0.05%) and twenty-five hundredths of one percent (0.25%). For convenience in mixing, the salt is preferably dissolved in a small amount of water before addition to the plastic dope. The dope can then be cast or otherwise formed as a solid by conventional techniques. In this manner the dichromate salt can be uniformly dispersed within the plastic in a ratio equalling from 0.1–1 gram of the dichromate salt for each 100 grams of the plastic.

Alternatively, where the dichromate salts are to be dispersed through a plastic material after the plastic has been established in solid form, the salts can be dissolved in an aqueous solvent in a selected concentration to form solution A, and the plastic can be immersed in solution A for a selected period of time. To establish sufficient quantities of the above-described organic dye compounds within a plastic material to provide the plastic with significant infra-red absorbing properties, solution A will require at least a one-half of one percent (0.5%) concentration of the dichromate salt therein. On the other hand, concentration of the dichromate salt up to saturated solutions thereof can be utilized.

When the plastic material is immersed in solution A, portions of the plastic will quickly reach a point of equilibrium in that the amount of dichromate salt established therein will have reached a maximum for the selected concentration of solution A. Thereafter, further immersion of the plastic in solution A will permit imbibition of the solution by other portions of the plastic material until dispersion of the dichromate salts through the plastic has reached uniform density. Continued immersion of the plastic material in solution A beyond that point will not be effective to increase the quantity of dichromate salt which can be established in the plastic material. Thus, the amount of the dichromate salt which can be dispersed throughout the plastic material will be primarily determined by the concentration of solution A, higher concentrations, of course, increasing the density of salt dispersion in the plastic material. An immersion period of from one (1) to ten (10) minutes will be required for achieving uniform density of salt dispersion in the plastic for concentrations of solution A which will be utilized in the process of this invention. When the described imbibition step has been completed, the plastic material is removed from solution A and is wiped or rinsed in water or is otherwise treated for removing any excess of solution A from the surfaces of the material and for removing dichromate salt crystals which may have formed on the material surfaces.

When a selected quantity of dichromate salt has been uniformly dispersed through a plastic material by either of the procedures set forth above, the plastic material can be aged, or more preferably exposed to heat and light, for drying the material and for setting the light-sensitive salt within the plastic as previously described. In this regard, it will be noted that fixing of the light-sensitive salt will be completed within a relatively short time after the plastic material has been dried. Of course, when the heat and light is relatively intense, the drying of the plastic and the setting or fixing of the dichromate salt can be accomplished quite rapidly in well known manner.

Thereafter, the treated plastic material is immersed in solution B to permit imbibition of that solution therein and to bring about the described reaction between the dichromate salts in the plastic and the selected organic substance carried by solution B. Solution B can embody any selected concentration of the organic substance therein up to saturated solutions of the organic substance. However, as a practical matter, concentrations of the organic substance less than five hundredths of one percent (0.05%) would not generally be used.

In this regard it should be noted that use of concentrations of the organic substance in solution B which are excessively high relative to the amount of dichromate salt established within the plastic material do not appear to contribute to a corresponding extent to the formation of the desired infra-red absorbing dye compounds. That is, for example where a selected concentration of dichromate salt in solution A is utilized for dispersing the salt within a plastic material, a concentration of a selected organic substance in solution B which is equal to about 1/5 the concentration of solution A appears to be all that is required.

In order to achieve desired concentrations of the noted organic substances in solution B and to encourage reaction between the organic substance carried in solution B and the dichromate salt dispersed in the plastic, the addition of a small amount of a mineral acid such as sulfuric acid, nitric acid or hydrochloric acid to solution B will be required. Concentrations of the acid between one-hundredth of one percent (0.01%) and one percent (1%) in solution B will be effective for these purposes, higher concentrations of the acid being permissible but contributing very little for further enhancing solubility of the organic substances in solution B or for further encouraging the described reaction. For convenience in preparing the aqueous solution B, the selected mineral acid is preferably partially diluted with water prior to addition to solution B in well known manner. Similarly, for convenience in dissolving the noted organic substances to be used in forming solution B, the selected organic substance can be preliminarily dissolved in a small amount of a suitable alcohol to form a stock solution which can then be more conveniently added to the aqueous solvent of solution B. For this purpose, any of the lower alkyl alcohols such as methyl, ethyl, propyl, butyl or amyl alcohol can be used, the organic substance in said stock alcohol solution preferably being between ten percent (10%) and fifty percent (50%) concentration. As noted above, concentrations of the selected organic substance in solution B can range from 0.05% to saturation according to this invention so that, where the organic substance is introduced into solution B in a stock alcohol solution as here described, only a small amount of alcohol will be introduced to solution B. Such low concentrations of alcohol in solution B will not significantly effect the described imbibition process and will not function in the process of this invention other than to substantially reduce the time required for completely dissolving the selected organic substance in solution B.

Where the plastic material utilized for forming the infra-red and ultra-violet absorbing filter material provided by this invention comprises a polyvinyl alcohol film material which is not soluble in cold water, solutions A and B are preferably prepared as above described. However, particularly where other plastic materials are used which would tend to swell or soften to an excessive degree during immersion in an aqueous solution, sodium chloride, sodium sulfate or other similar inorganic salt can be added to the solutions for substantially reducing swelling and softening of the plastic materials during immersion in the solutions.

The plastic material is preferably immersed in solution B for a substantial period of time so that a point is reached wherein additional immersion of the plastic would induce further reaction between the dichromate salt in the plastic and the organic substance carried by solution B only at a relatively slow rate. This period of immersion will vary from a minimum of approximately five (5) minutes to a period of approximately three (3) hours depending primarily upon the temperature at which the immersion occurs. That is, the immersion of the plastic material in solution B must continue for a sufficiently long period of time to substantially complete the reaction which can be induced by the selected quantity of dichromate salt dispersed within the plastic material. The described reaction will occur at a satisfactory rate at temperatures as low as 60° Fahrenheit but as a practical matter would not normally be attempted at less than room temperature. On the other hand, where the reaction occurs at elevated temperatures above approximately 120° Fahrenheit, there would be danger of excessive swelling of the selected plastic material. Thereafter continued immersion of the plastic in solution B for a longer period, for example as long as five (5) days at room temperature, will not be effective to further reduce the transmittance of the plastic to any significant extent but does appear to somewhat stabilize the transmissive and absorptive characteristics of the material.

Although the process of manufacturing the filter material provided by this invention can be varied as above described, a preferred process for preparing the filter material can be performed as follows.

As preliminary steps, diethoxyaniline is dissolved in ethyl alcohol in the ratio of 3 grams of diethoxyaniline to 27 cc. of alcohol for forming a stock diethoxyaniline solution of approximately ten percent (10%) concentration, and concentrated sulfuric acid is diluted with water in conventional manner for forming a one percent (1%) sulfuric acid solution.

Solutions A and B are then prepared in suitable receptacles, solution A comprising 30 grams of ammonium dichromate salt dissolved in 1000 cc. of water for forming a solution of approximately three percent (3%) concentration. Solution B comprises 30 cc. of the stock diethoxyaniline solution and 100 cc. of the sulfuric acid solution described above which are further diluted in 900 cc. of water for forming a solution of approximately three-tenths of one percent (0.3%) concentration of diethoxyaniline and one one-hundredth of one percent (0.01%) concentration of sulfuric acid.

A film of polyvinyl alcohol of approximately 0.003 inch thickness is then laminated to each side of a supporting cellulose acetate film which has been subcoated with polyvinyl alcohol in conventional manner, the polyvinyl alcohol film being of the water-permeable type which is not soluble in cold water.

The plastic film is first immersed in solution A for a period of three minutes to permit imbibition of solution A for establishing dichromate salt in dispersed relation therein. The film is then removed from solution A and is wiped clean to remove excess solution from the surfaces thereof. Then the film is exposed to visible light for drying the film and for fixing the light-sensitive dichromate salt therein, for example by suspending the film approximately ten inches from a pair of 250-watt heat lamps of conventional type for a period of about three minutes. When the film is thoroughly dried, and all of the dichromate salt dispersed therein has been thoroughly set by exposure to the light, the film is again rinsed in water and is wiped clean for removing loose dichromate salt crystals which may have formed on the film surfaces.

The treated film is then immersed in solution B for a period of approximately two and one-half hours at room temperature to permit reaction between the dichromate salt in the plastic and the 2,5-diethoxyaniline carried by solution B. After immersion of the plastic in solution B for this period, the described reaction will have slowed to a relatively slow rate. The film is then removed from solution B and is washed in water and permitted to dry. It should be noted that where the plastic film is immersed in solution B at a temperature of approximately 120° Fahrenheit, the noted degree of reaction can be completed in about ten (10) minutes.

Where the plastic material utilized in forming the infra-red and ultra-violet absorbing material of this invention comprises polyvinyl alcohol, it will generally be desirable to provide for cross-linking of the plastic to harden the plastic and to render the plastic more solvent-resistant. It will also be desirable to provide a final plastic material which is slightly acidic. For this purpose, an aqueous boric acid solution of concentration from two percent (2%) to approximately five percent (5%) (saturation) can be prepared. Further, a weak, preferably non-volatile acid such as citric acid is added to the solution in concentration from 0.05% to 0.5%. The polyvinyl alcohol material treated as above described can then be immersed in the boric acid solution for at least one (1) minute, and longer if desired, at room temperature. The boric acid in said solution will affect cross-linking of the polyvinyl alcohol at least at the surface of the film and will provide a relatively hard film which is no longer water-soluble or water-permeable. The citric acid in said solution will tend to remain in the plastic material for somewhat stabilizing the absorptive characteristics of the material.

After completion of the described process, the plastic film, which was originally clear, will have a green-yellow color and will have absorptive and transmissive properties as illustrated in the curve *a* of FIG. 1. As can be seen, the film will have a peak transmission of approximately thirty-eight percent (38%) for light of 6600 Angstrom units wavelength in the visible region of the spectrum. Transmission falls off sharply for light of shorter wavelengths and almost complete cutoff is achieved for ultra-violet light of wavelengths shorter than 4000 Angstrom units. Transmission falls off less sharply for light of longer wavelengths but is reduced to less than thirty percent (30%) for infra-red light of wavelengths above 10,000 Angstrom units.

The process set forth in the example discussed with reference to FIG. 1 can be altered, for example, by substituting the same concentration of 2,5-dimethoxyaniline in solution B for the 2,5-diethoxyaniline there described. Where the process is otherwise identical to that of the previous example, including boricating of the plastic material, there will be provided a plastic film having a green-yellow appearance which has transmissive and absorptive properties as illustrated by the curve $b$ in FIG. 2. As can be seen, this film will have a peak transmission of approximately twenty-four percent (24%) for visible light of 5800 Angstrom units wavelength. Transmission of this film also falls off sharply for light of shorter wavelengths so that almost complete cutoff is achieved for light including ultra-violet light, below 4800 Angstrom units wavelength. In a manner similar to that described with reference to FIG. 1, transmission for this film falls off less sharply for light of longer wavelengths. However, the film transmits less than ten percent (10%) of infra-red light of wavelengths above 7600 Angstrom units and achieves almost complete cutoff for infra-red light of wavelengths longer than 11,000 Angstrom units.

It should be noted that the plastic filter materials prepared according to the method of this invention can be impregnated with conventional dyes and the like in conventional manner for adapting the filter for lower transmission of light of selected wavelengths if desired. Further, where the filter is formed of the water-permeable polyvinyl alcohol film described in the above examples, the film can be treated in conventional manner or can be conveniently laminated with other polyvinyl alcohol films to adapt the film for polarizing light which is transmitted therethrough.

As thus far described, the process of this invention is adapted to provide plastic filter materials having uniform absorptive and transmissive properties throughout the material. However, if desired, the process can be modified to provide a plastic light filter in which selected portions of the filter have different absorptive and transmissive characteristics. In this modified process, solutions A and B can be prepared as described above, and a selected plastic material can be treated in solution A in the manner previously explained. However, when the plastic is thereafter exposed to light, the light can be directed upon the plastic in a controlled pattern in the manner of making a photograph or the like so that only the dichromate salt in that part of the plastic upon which the light impinges will be set or fixed in the plastic material. The plastic can then be immersed in water for a suitable period of time from a few minutes to several hours until the dichromate salts which have not been set by exposure to light have been leached from the plastic. The plastic is then treated in solution B in the manner previously explained so that, as will be understood, organic dye compounds will be formed within the plastic in a pattern corresponding to said light pattern. Thereafter, if desired, the plastic can again be imersed in water for leaching out excess organic substance which has been dispersed in the plastic in areas outside those defined by said light pattern. As will be understood, the sequence of immersion in solution A, exposure to light, and leaching prior to immersion in solution B can be repeated a selected number of times with different light patterns being directed upon the plastic in each sequence, if desired, so that, where the concentration of Solution A is different for each of said sequences, dichromate salts can be dispersed through various parts of the plastic in a variety of controlled patterns of different salt density. Thereafter, the plastic can be treated in solution B in the manner previously explained for providing a filter having absorptive and transmissive properties which vary in accordance with said patterns and with different concentrations of solution A. By this means, such a filter can be provided with infra-red and ultra-violet absorbing reticles and the like or can be provided with transmission and absorption gradients in a simple and convenient manner.

Although particular embodiments of the materials and methods provided by this invention have been described for the purpose of illustration, it should be understood that this invention includes all modifications and equivalents thereof which fall within the scope of the appended claims.

Having described my invention, I claim:

1. A method for forming a plastic filter material comprising the steps of providing a solid plastic material having a dichromate salt dispersed therein, exposing the material to light for fixing the dichromate salt within the material, providing a solution embodying an organic substance selected from the group consisting of 2,5-diethoxyaniline, 2,5-dimethoxyaniline, aniline, o-toluidine, m-toluidine, and N-phenyl-p-phenylenediamine in a solvent adapted to permeate said plastic material, and immersing the plastic material in said solution for reacting the dichromate salt with said selected organic substance to form infra-red and ultra-violet-absorbing organic dye compounds in dispersed relation within the material.

2. A method for forming a plastic filter material comprising the steps of providing a first aqueous solution of a water-soluble plastic material; dispersing a dichromate salt within said first solution in ratio from 0.1 gram to 1 gram for each 100 grams of said plastic material; casting said first solution for forming a solid plastic material having said dichromate salt dispersed therein; exposing said solid material to light for fixing the dichromate salt within the solid material; preparing a second aqueous solution embodying an organic substance selected from the group consisting of 2,5-diethoxyaniline and 2,5-dimethoxyaniline, aniline, o-toluidine, m-toluidine and N-phenyl-p-phenylenediamine in concentration between 0.05% and saturation, a mineral acid in concentration from 0.01% to 1%, alcohol in ratio from 0 to 1 part alcohol to each part of said selected organic substance, and sodium chloride in concentration from 0% to saturation; maintaining said second solution at a temperature between approximately 60° F. and 120° F.; immersing said solid plastic material in said second solution for a period from 5 minutes to 5 days to imbibe said solution within the plastic material and to form ultra-violet and infra-red absorbing organic dye compounds therein by reaction with the dichromate salt dispersed therein; selectively preparing an additional aqueous solution containing boric acid in concentration between 2% and 5% and citric acid in concentration between 0.05% and 0.5%; and selectively immersing said plastic material in the additional solution for at least one minute.

3. A method for forming a plastic filter material comprising the steps of preparing a first aqueous solution of a dichromate salt in concentration between 0.5% and saturation, and sodium chloride in concentration between 0% and saturation; preparing a second aqueous solution of an organic substance selected from the group consisting of 2,5-diethoxyaniline, 2,5-dimethoxyaniline, aniline, o-toluidine, m-toluidine, and N-phenyl-p-phenylenediamine in concentration between 0.05% and saturation, a mineral acid in concentration from 0.01% to 1%, alcohol in ratio from 0 to 1 part alcohol to each part of said selected organic substance, and sodium chloride in concentration from 0% to saturation; maintaining said solutions at a temperature between approximately 60° F. and 120° F.; providing a water-permeable plastic material; immersing said plastic material in said first solution for a period between 1 and 10 minutes for imbibing said solution therein to establish said dichromate salt in dispersed relation within the plastic material; exposing the plastic material to light for fixing the dichromate salt therein; immersing the plastic material in said second solution for a period from 5 minutes to 5 days to imbibe said second solution within the plastic material and to form ultraviolet and infra-red absorbing organic dye compounds therein by reaction with the dichromate salt dispersed therein; selectively preparing an additional aqueous solution containing boric acid in concentration between 2% and 5% and citric acid in concentration between 0.05% and 0.5% and selectively immersing the plastic material in the boric acid solution for at least one minute.

4. A method for forming a plastic filter material comprising the steps of preparing a first aqueous solution of a salt selected from the group consisting of ammonium dichromate, potassium dichromate and sodium dichromate in concentration between 0.5% and saturation; preparing a second aqueous solution embodying an organic substance selected from the group consisting of 2,5-diethoxyaniline, 2,5-dimethoxyaniline, o-toluidine, aniline, m-toluidine, and N-phenyl-p-phenylenediamine, in concentration between 0.05% and saturation and a mineral acid selected from the group consisting of sulfuric, nitric and hydrochloric in concentration from 0.01% to 1%; maintaining said solutions at a temperature between approximately 60° F. and 120° F.; providing a water-permeable plastic material; immersing said plastic in said first solution for a period between 1 and 10 minutes for imbibing said solution therein to establish said dichromate salt in dispersed relation within the plastic; exposing said material to light for fixing the selected salt therein; and immersing the plastic in said second solution for a period from 5 minutes to 3 hours to imbibe said second solution within the plastic and to form ultra-violet and infra-red-absorbing organic dye compounds within the plastic by reaction with the selected dichromate salt dispersed therein.

References Cited in the file of this patent

UNITED STATES PATENTS 2,193,035     Matthews et al.     Mar. 12, 1940
2,971,921     Coleman et al.     Feb. 14, 1961